(12) United States Patent
Harada et al.

(10) Patent No.: US 11,553,347 B2
(45) Date of Patent: Jan. 10, 2023

(54) ABNORMAL TRAFFIC ANALYSIS APPARATUS, ABNORMAL TRAFFIC ANALYSIS METHOD, AND ABNORMAL TRAFFIC ANALYSIS PROGRAM

(71) Applicant: NIPPON TELEGRAPH AND TELEPHONE CORPORATION, Tokyo (JP)

(72) Inventors: Takafumi Harada, Musashino (JP); Gembu Morohashi, Musashino (JP); Hiroki Ito, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 279 days.

(21) Appl. No.: 16/982,266

(22) PCT Filed: Mar. 8, 2019

(86) PCT No.: PCT/JP2019/009249
§ 371 (c)(1),
(2) Date: Sep. 18, 2020

(87) PCT Pub. No.: WO2019/181551
PCT Pub. Date: Sep. 26, 2019

(65) Prior Publication Data
US 2021/0058794 A1 Feb. 25, 2021

(30) Foreign Application Priority Data
Mar. 23, 2018 (JP) .............................. JP2018-057087

(51) Int. Cl.
*H04L 29/06* (2006.01)
*H04W 12/128* (2021.01)
*H04L 9/40* (2022.01)

(52) U.S. Cl.
CPC ....... *H04W 12/128* (2021.01); *H04L 63/1425* (2013.01); *H04L 63/166* (2013.01)

(58) Field of Classification Search
CPC ... H04W 12/128; H04W 24/08; H04W 28/02; H04W 36/02; H04W 88/18; H04L 63/1425; H04L 63/166; H04M 3/00
See application file for complete search history.

(56) References Cited

U.S. PATENT DOCUMENTS

2004/0047356 A1\* 3/2004 Bauer ................. H04L 63/1416
370/401
2008/0196100 A1\* 8/2008 Madhavan ............ H04L 63/145
726/22
(Continued)

FOREIGN PATENT DOCUMENTS

CN 102487539 B \* 12/2014
JP H0846643 A 2/1996
(Continued)

OTHER PUBLICATIONS

Bull, Peter, et al. "Flow based security for IoT devices using an SDN gateway." 2016 IEEE 4th international conference on future internet of things and cloud (FiCloud). IEEE, 2016. (Year: 2016).\*
(Continued)

*Primary Examiner* — Joseph P Hirl
*Assistant Examiner* — Ka Shan Choy

(57) ABSTRACT

An abnormal traffic analysis apparatus includes receiving means for receiving traffic from a device, analysis means for analyzing whether or not traffic received from the device is abnormal traffic, analysis result recording means for recording a result of analysis performed by the analysis means, and device management means for managing movement of the device between edges. If it is determined by the device management means that a device that is a target of analysis performed by the analysis means moves to an edge, the
(Continued)

receiving means creates information for continuing analysis of traffic received from the device and transmits the information to an apparatus for analyzing traffic that is included in the edge to which the device moves.

6 Claims, 12 Drawing Sheets

(56) References Cited

U.S. PATENT DOCUMENTS

2013/0303120 A1    11/2013    Kusumoto
2019/0132358 A1*    5/2019    DiValentin .......... H04L 63/1416

FOREIGN PATENT DOCUMENTS

| JP | 2011259014 A | 12/2011 | |
|---|---|---|---|
| WO | WO-2012124207 A1 | 9/2012 | |
| WO | WO-2016032491 A1 * | 3/2016 | ............. H04L 12/26 |
| WO | WO-2018034201 A1 | 2/2018 | |

OTHER PUBLICATIONS

"LTE services "Xi" (Crosy) provide a social infrastructure that contributes to". NTT Technical Journal, vol. 23, No. 7, (2011), pp. 48-51.

* cited by examiner

Fig. 6

| NAME | TYPE | REPETITION | CONTENT |
|---|---|---|---|
| servicelist | LIST | 1..n | LIST OF CORRESPONDENCE. REPEATED AS MANY AS THE NUMBER OF EDGES |
|   service_name | CHARACTER STRING | 1 | NAME OF SERVICE |
|   edgelist | LIST | 1..m | LIST OF EDGES PROVIDING CORRESPONDING SERVICE |
|     edge_id | CHARACTER STRING | 1 | EDGE IDENTIFIER |
|     celllist | LIST | 1..o | LIST OF CELLS HANDLING CORRESPONDING SERVICE IN CORRESPONDING EDGE |
|       cell_id | CHARACTER STRING | 1 | CELL IDENTIFIER |

ABNORMAL TRAFFIC ANALYSIS APPARATUS, ABNORMAL TRAFFIC ANALYSIS METHOD, AND ABNORMAL TRAFFIC ANALYSIS PROGRAM

CROSS-REFERENCE TO RELATED APPLICATIONS

This application is a 371 U.S. National Phase of International Application No. PCT/JP2019/009249, filed on Mar. 8, 2019, which claims priority to Japanese Application No. 2018-057087 filed on Mar. 23, 2018. The entire disclosures of the above applications are incorporated herein by reference.

TECHNICAL FIELD

The present invention relates to an abnormal traffic analysis apparatus, an abnormal traffic analysis method, and an abnormal traffic analysis program that can be applied to SIEM (Security Information and Event Management), security engines, edge computing, etc.

BACKGROUND ART

In recent years, due to the spread of IoT devices, a large number of IoT devices access a network and cause a large volume of traffic. Furthermore, for the use of IoT devices to control etc., in some cases, low delay is more required for IoT devices when compared to IT devices. Under these trends, architecture regarding networks and information processing needs to be changed, and an edge computing method is proposed as one option for servers in a server client model.

Servers are distributed in edge computing. Similarly to the case of IT devices, security measures are also required for IoT devices (hereinafter also referred to as "UE").

CITATION LIST

Non Patent Literature

[NPL1] "LTE service "Xi" as social infrastructure useful for productive life", NTT Technical Journal, pp. 48-51, 2011. 7

SUMMARY OF THE INVENTION

Technical Problem

Handover technology of mobile stations, which is a representative example of conventional distributed coordination methods, is a method for coordinating a mobile terminal and a network when a base station communicating with an IoT device (UE) shifts to another base station. In some cases, multi-layer security analysis engines that are distributed to edges perform analysis using past traffic data, and therefore, when a UE has moved from a base station to another base station, it is essential to transmit data to the base station to which the UE has moved. There is existing technology for coordinating base stations, but there is a problem in that, although information that is necessary for detection needs to be transmitted to adapt the technology to security engines of respective edges, transmission of the information is not considered in the existing technology.

The present invention was made to solve the above-described problem, and it is an object of the present invention to provide an abnormal traffic analysis apparatus, an abnormal traffic analysis method, and an abnormal traffic analysis program that can seamlessly perform analysis by appropriately sharing information even if an IoT device moves between edges.

Means for Solving the Problem

To solve the problem, the present invention takes the following measures.

In a first aspect of the present invention, an abnormal traffic analysis apparatus includes receiving means for receiving traffic from a device, analysis means for analyzing whether or not traffic received from the device is abnormal traffic, analysis result recording means for recording a result of analysis performed by the analysis means, and device management means for managing movement of the device between edges. If it is determined by the device management means that a device that is a target of analysis performed by the analysis means moves to an edge, the receiving means creates information for continuing analysis of traffic received from the device and transmits the information to an apparatus for analyzing traffic that is included in the edge to which the device moves.

Effects of the Invention

According to the present invention, it is possible to seamlessly perform analysis by appropriately sharing information even if an IoT device moves between edges.

BRIEF DESCRIPTION OF DRAWINGS

FIG. 6 is a diagram showing one example of edge/service/cell correspondence information (management data) indicating a relationship between cells, edges, and services.

DESCRIPTION OF EMBODIMENTS

Figure 1:
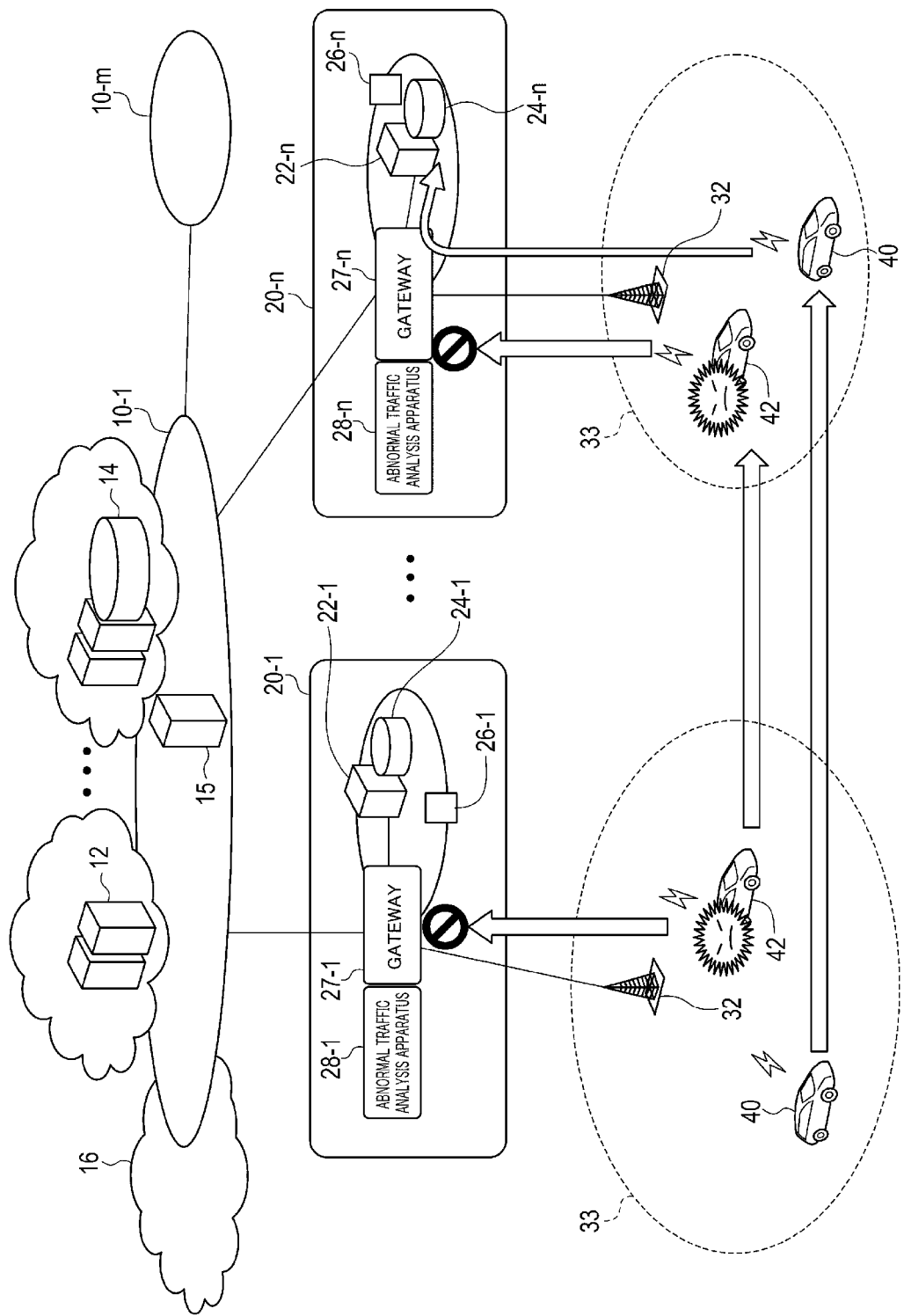
FIG. 1 is a diagram showing one example of a communication system according to the present embodiment.

The following describes the present embodiment with reference to the accompanying drawings. FIG. 1 is a diagram showing one example of a communication system according to the present embodiment. The communication system shown in FIG. 1 realizes an autonomous mobility system for causing vehicles, such as automobiles, to autonomously travel, for example. In the autonomous mobility system, various kinds of data (probe data) detected using various sensors, devices, etc., provided in an automobile etc., are transmitted from an IoT device 40 installed in the automobile to a server, for example. The autonomous mobility system reflects probe data received from IoT devices of a large number of automobiles etc., to a dynamic map in real time, and transmits data of the dynamic map to IoT devices of automobiles. The automobiles execute control for self-driving based on the data of the dynamic map.

In the communication system according to the present embodiment, transmission and reception of data (traffic) between an IoT device installed in an automobile etc., and a server are performed using LTE (Long Term Evolution) communication that uses a mobile network (33), for example.

In the communication system shown in FIG. 1, core networks 10 (10-1, . . . , 10-m) are provided on the Internet 16. A cloud server 12, a dynamic map server 14, and a monitoring target information management server 15 are provided in each core network 10, for example. The cloud server 12 is a server that supports various services.

The monitoring target information management server 15 manages information (monitoring target information) regarding IoT devices 40, such as terminals (UE: User Equipment) installed in automobiles etc., to be monitored. The monitoring target information management server 15 receives a message from a management server 17 (shown in FIG. 2) that manages inter-edge movement of IoT devices provided in the mobile network 33, for example, and manages a correspondence relationship regarding location area conditions, such as a correspondence relationship between a service used by a terminal, an edge (local network 20) with which the terminal exchanges data, and a cell (base station 32) that corresponds to a current location of the terminal, based on unified identification information (ID) that is unique to an IoT device, for example. If it is detected that a terminal (IoT device) has moved to the area of a cell (base station 32) that corresponds to a different local network 20 along with travelling of an automobile, the monitoring target information management server 15 receives a message about a handover trigger from the management server 17, and broadcasts, to abnormal traffic analysis apparatuses 28 (28-1, . . . , 28-n) that are respectively included in a plurality of local networks 20 (20-1, . . . , 20-n), a message that notifies the abnormal traffic analysis apparatuses 28 of the movement of the target IoT device between edges.

The dynamic map server 14 creates a dynamic map based on data (probe data) received from a plurality of IoT devices, and distributes dynamic map data to terminals (IoT devices). The dynamic map server 14 creates a dynamic map of a higher level than dynamic maps that are managed by dynamic map servers 24 (24-1, . . . , 24-n) of the local networks 20 (20-1, . . . , 20-n), for example.

The local networks 20 (20-1, . . . , 20-n) are networks for realizing the communication system (autonomous mobility system) using an edge computing method. Namely, the local networks constitute network slices that provide services of the autonomous mobility system, at positions that are closer to IoT devices (terminals) than the core networks 10 are. Thus, low-delay communication between IoT devices and servers is realized. In the communication system using the edge computing method, edge servers (22-1, . . . , 22-n) that provide services are distributed to the plurality of local networks 20-1, . . . , 20-n.

To provide services of the autonomous mobility system, the dynamic map server 24, a probe collecting server 26, a gateway 27, and the abnormal traffic analysis apparatus 28 are provided in each local network 20. Note that the local networks 20-1, . . . , 20-n have the same configuration, and a detailed description of individual local networks is omitted.

The dynamic map server 24 creates a dynamic map based on probe data collected from a plurality of IoT devices 40 by the probe collecting server 26, and distributes dynamic map data via the gateway 27 to the IoT devices 40. The dynamic map server 24 manages a dynamic map of an area that is more localized than dynamic maps managed by the dynamic map servers 14 provided in the core networks 10.

The probe collecting server 26 receives probe data transmitted from a plurality of IoT devices 40 via the gateway 27 and records the probe data. The probe collecting server 26 provides probe data collected from the IoT devices 40 to the dynamic map server 24. Probe data includes various kinds of data such as the location of a travelling automobile, the vehicle speed, braking, fuel consumption, etc.

The gateway 27 connects the local network 20 (network slice) to other networks. The gateway 27 receives data from an IoT device 40 that is connected to a Wi-Fi access point 30, via the Internet 16, for example. Also, the gateway 27 receives data from an IoT device 40 that is connected to a base station 32, via a mobile network 33. The gateway 27 cooperates with the abnormal traffic analysis apparatus 28 and has a function of blocking abnormal traffic that is determined as being abnormal through analysis performed by the abnormal traffic analysis apparatus 28, e.g., traffic transmitted from a malicious IoT device 42.

The abnormal traffic analysis apparatus 28 operates as an abnormal traffic detection engine for detecting abnormal traffic, in cooperation with the gateway 27. The abnormal traffic analysis apparatus 28 inputs and analyzes traffic (mirroring traffic) transmitted and received via the gateway 27, and detects and determines abnormal traffic transmitted from a malicious IoT device 42, for example.

Figure 2:
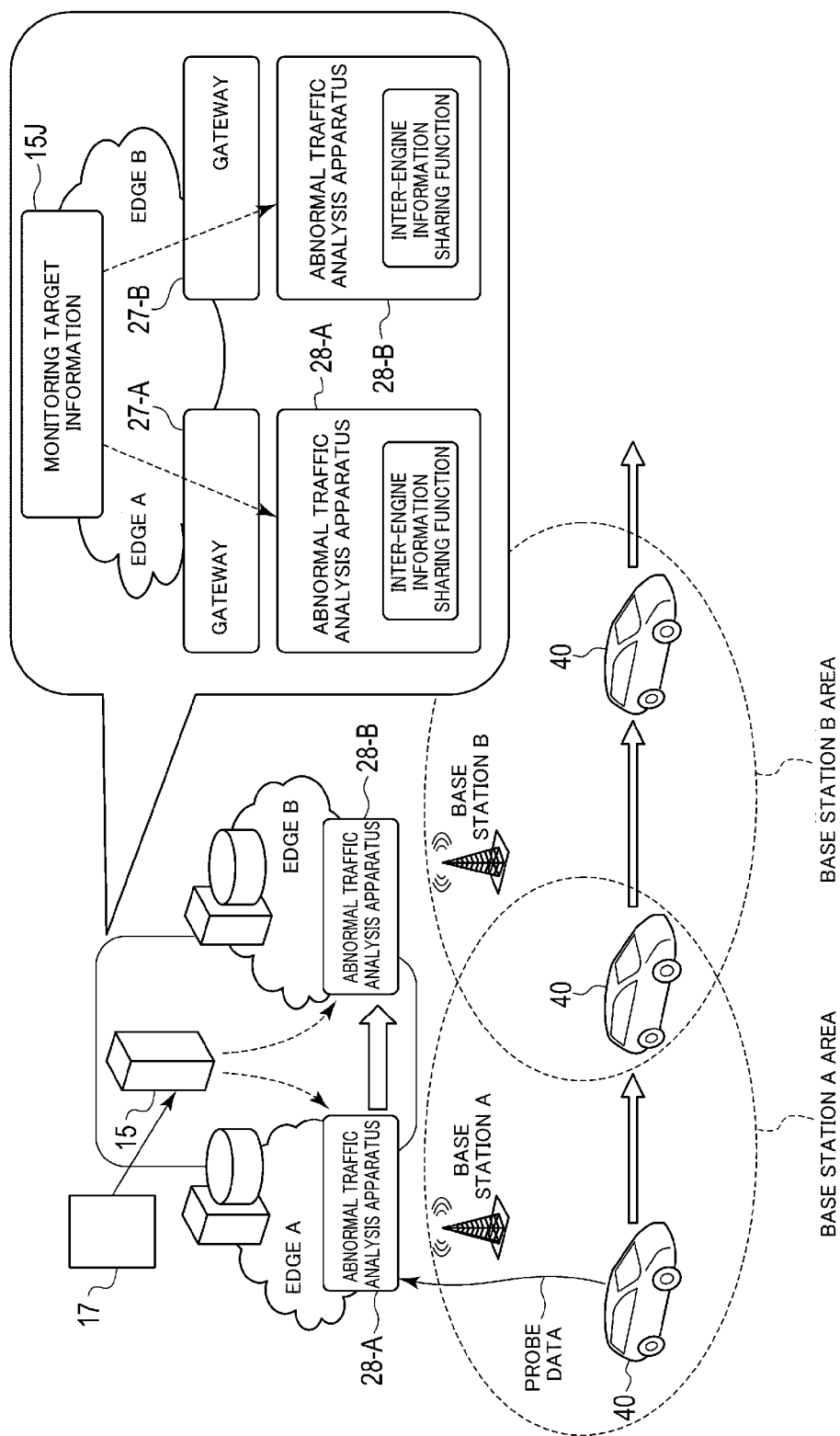
FIG. 2 is a diagram for schematically showing distributed coordination security analysis technology used in the communication system shown in FIG. 1.

FIG. 2 is a diagram for schematically showing distributed coordination security analysis technology used in the communication system shown in FIG. 1.

As shown in FIG. 2, the monitoring target information management server 15 manages, as monitoring target information 15J, a correspondence relationship regarding location area conditions, such as a correspondence relationship between a service, an edge, and a cell (base station), with respect to each IoT device to be monitored based on a unified ID of the IoT device. The monitoring target information management server 15 broadcasts monitoring target information including the correspondence relationship etc., to abnormal traffic analysis apparatuses 28-A and 28-B (abnormal traffic analysis engines) of respective edges A and B. If a monitoring target vehicle (IoT device 40) has moved between base stations, the movement of the IoT device 40 is detected using identification information and movement destination information (handover information) that are presented by a moving object network management system of the mobile network 33. For example, the abnormal traffic analysis apparatus (in the present embodiment, a security engine) 28-A of the edge A, which has detected movement of an IoT device 40 from the area of a base station A to the area of a base station B, transmits information that is necessary for abnormal traffic analysis to the abnormal traffic analysis apparatus (in the present embodiment, a security engine) 28-B of the edge B. Accordingly, with respect to traffic received from the IoT device 40 that has moved to the area of the base station B, the abnormal traffic analysis apparatus 28-B can detect abnormal traffic with high precision by using the information received from the abnormal traffic analysis apparatus 28-A.

In the communication system according to the present embodiment, the abnormal traffic analysis apparatuses 28 provided in respective edges each have a function (distributed coordination management unit described later) for sharing information between security engines, and owing to this function, the abnormal traffic analysis apparatuses 28 distributed to the plurality of edges cooperate with each other to exchange information and continuously perform monitoring while following movement of a monitoring target IoT device.

Figure 3:
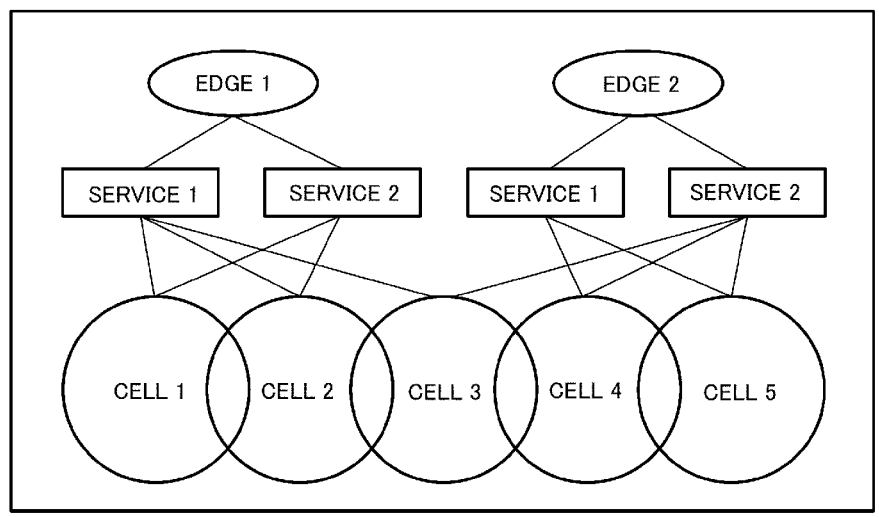
FIG. 3 is a diagram showing one example of a relationship between cells, edges, and services.

FIG. 3 is a diagram showing one example of a relationship between cells, edges, and services.

Data that indicates a relationship between cells, edges, and services is used to determine whether or not an edge changes when a cell in which an IoT device 40 is located changes through handover that is performed along with movement of the IoT device 40.

Each edge provides one or more services, but all edges not necessarily provide the same service. Two examples of services are probe information collection and LDM (Locl Dynamic Map) distribution. Each cell belongs to an edge, but the edge to which a cell belongs may vary according to the service. The edge to which a cell belongs is uniquely determined by a pair of the cell and a service.

In the example shown in FIG. 3, as for Service 1, movement between edges does not occur along with movement between Cell 2 and Cell 3, but movement between edges occurs along with movement between Cell 3 and Cell 4. On the other hand, as for Service 2, movement between edges occurs along with movement between Cell 2 and Cell 3.

Figure 4:
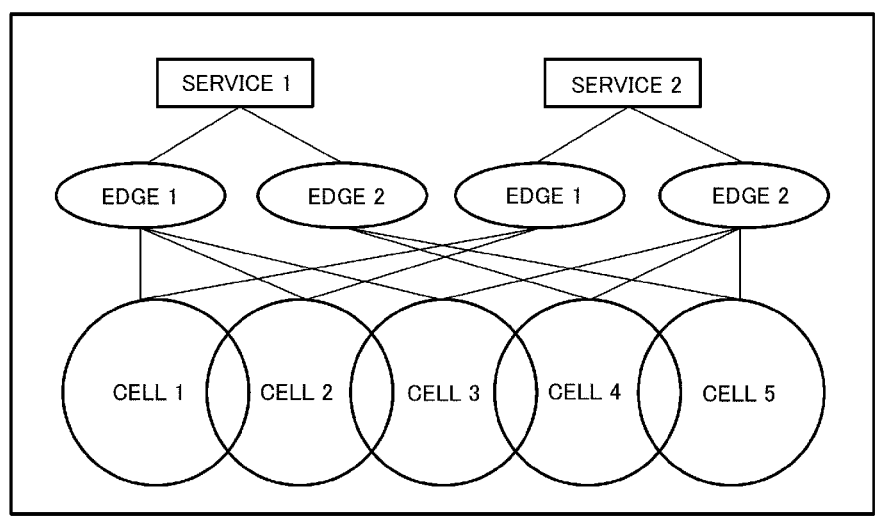
FIG. 4 is a diagram showing another example of a relationship between cells, edges, and services.

Note that the above-described relationship between cells, edges, and services can be expressed as shown in FIG. 4. FIG. 4 is a diagram showing another example of a relationship between cells, edges, and services.

Figure 5:
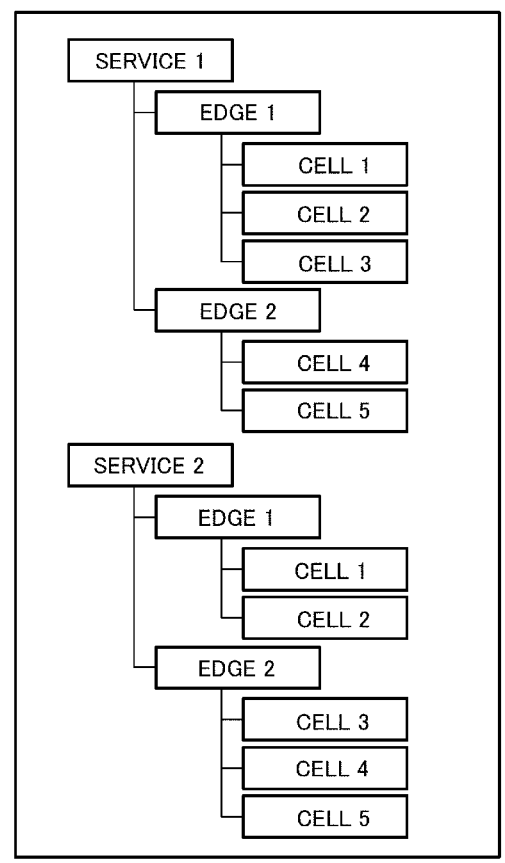
FIG. 5 is a diagram showing one example of a data structure for expressing a relationship between cells, edges, and services.

A directory (or tree) structure can be used as a data structure for expressing the above-described relationship between cells, edges, and services. FIG. 5 is a diagram showing one example of a data structure for expressing a relationship between cells, edges, and services.

The following describes an edge movement determination method (1) to (4) that is performed based on the data structure shown in FIG. 5 when movement between cells occurs.

(1) Acquire IMSI (International Mobile Subscriber Identity), which is an identifier that is unique to an LTE communication channel installed in an IoT device 40, and a switching destination cell identifier (c2) through handover information notification (described later).

(2) Acquire a currently located cell identifier (c1) of a UE identifier that corresponds to the IMSI, based on monitoring target information managed by the monitoring target information management server 15 (the currently located cell identifier (c1) and the switching destination cell identifier (c2) are not necessarily successive).

(3) Retrieve the currently located cell identifier (c1) and the switching destination cell identifier (c2) for each service, and acquire edge identifiers (e1, e2) to which respective cells belong.

(4) Perform (3) for all services.

FIG. 6 is a diagram showing one example of edge/service/cell correspondence information (management data) that indicates a relationship between cells, edges, and services. Note that it is assumed that all edges included in the same service differ from each other and cells having the same name do not exist in the same edge under different services, and thus the consistency of data is maintained.

Figure 7:
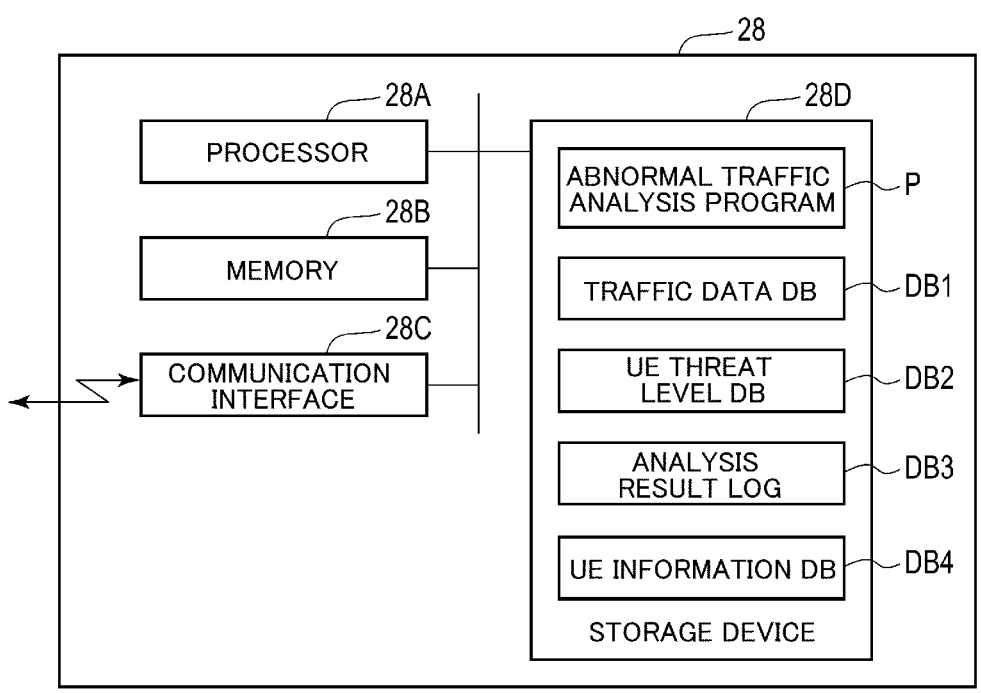
FIG. 7 is a block diagram showing a configuration of an abnormal traffic analysis apparatus according to the present embodiment.

FIG. 7 is a block diagram showing a configuration of the abnormal traffic analysis apparatus 28 according to the present embodiment.

The abnormal traffic analysis apparatus 28 includes a computer that executes programs, a processor 28A, a memory 28B, a communication interface 28C, and a storage device 28D.

The processor 28A is a CPU (Central Processing Unit), for example, and controls each unit of the abnormal traffic analysis apparatus 28 by executing a program stored in the memory 28B. By executing an abnormal traffic analysis program P, the processor 28A realizes an abnormal traffic detection engine (shown in FIG. 3) for detecting abnormal traffic transmitted and received via the gateway 27. The abnormal traffic detection engine includes a functional module and a database.

The memory 28B is used as a work area for processing performed by the processor 28A, and programs and data are stored in the memory 28B.

The communication interface 28C controls communication under the processor 28A.

The storage device 28D is an HDD (Hard Disk Drive) or an SSD (Solid State Drive), for example, and programs to be executed by the processor 28A and various kinds of data are stored in the storage device 28D. The programs stored in the storage device 28D include the abnormal traffic analysis program P. Along with execution of the abnormal traffic analysis program P, a traffic data database DB1, a UE threat level database DB2, an analysis result log DB3, a UE information database DB4, etc., are stored in the storage device 28D.

Figure 8:
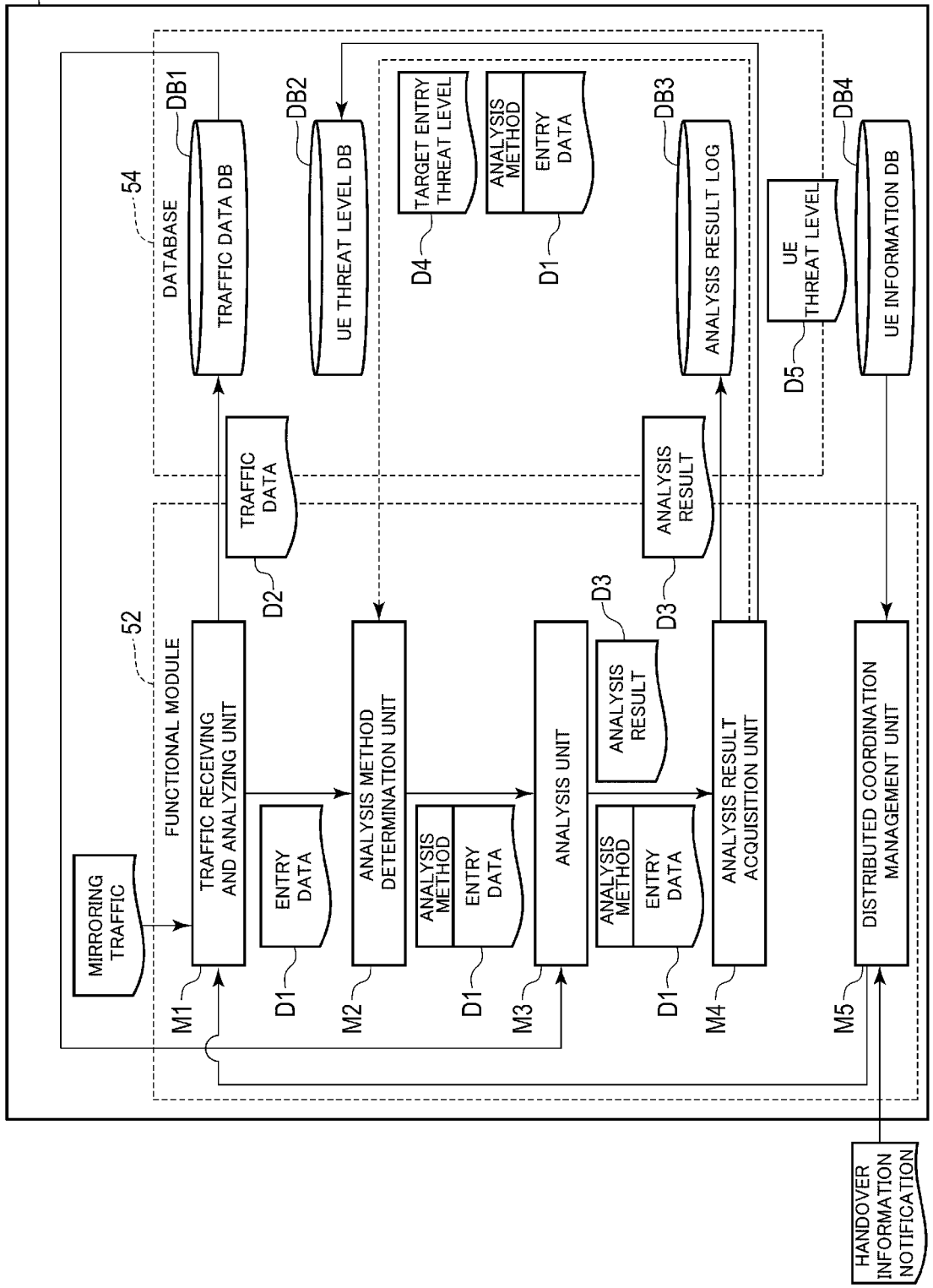
FIG. 8 is a block diagram showing a functional configuration of an abnormal traffic detection engine according to the present embodiment.

FIG. 8 is a block diagram showing a functional configuration of an abnormal traffic detection engine 50 according to the present embodiment. The abnormal traffic detection engine 50 is realized as a result of the abnormal traffic analysis program P being executed by the processor 28A.

A functional module 52 of the abnormal traffic detection engine 50 includes a traffic receiving and analyzing unit M1, an analysis method determination unit M2, an analysis unit M3, an analysis result acquisition unit M4, and a distributed coordination management unit M5. Also, as a database 54 for storing data that is processed by the functional module 52, the traffic data database DB1, the UE threat level database DB2, the analysis result log DB3, the UE information database DB4, and an entry database DB5 (not shown) are provided.

The traffic receiving and analyzing unit M1 receives traffic (mirroring traffic) that is the same as traffic transmitted to and received by the gateway 27. The traffic receiving and analyzing unit M1 records traffic data, analyzes traffic (a header portion and a payload portion), and creates entry data, for example.

The analysis method determination unit M2 determines an analysis algorithm for detecting abnormality of traffic and parameters to be used in analysis that is performed in accordance with the analysis algorithm.

The analysis unit M3 analyzes traffic according to the analysis algorithm and parameters determined by the analysis method determination unit M2.

The analysis result acquisition unit M4 acquires and records a result of analysis performed by the analysis unit M3.

The distributed coordination management unit M5 receives monitoring target information from the monitoring target information management server 15 and a handover information notification message from the moving object network management system (management server 17), and determines movement between edges accompanying movement of an IoT device between cells, according to the notification message, for example.

Next, operations performed in the communication system according to the present embodiment to detect abnormal traffic will be described.

Figure 9:
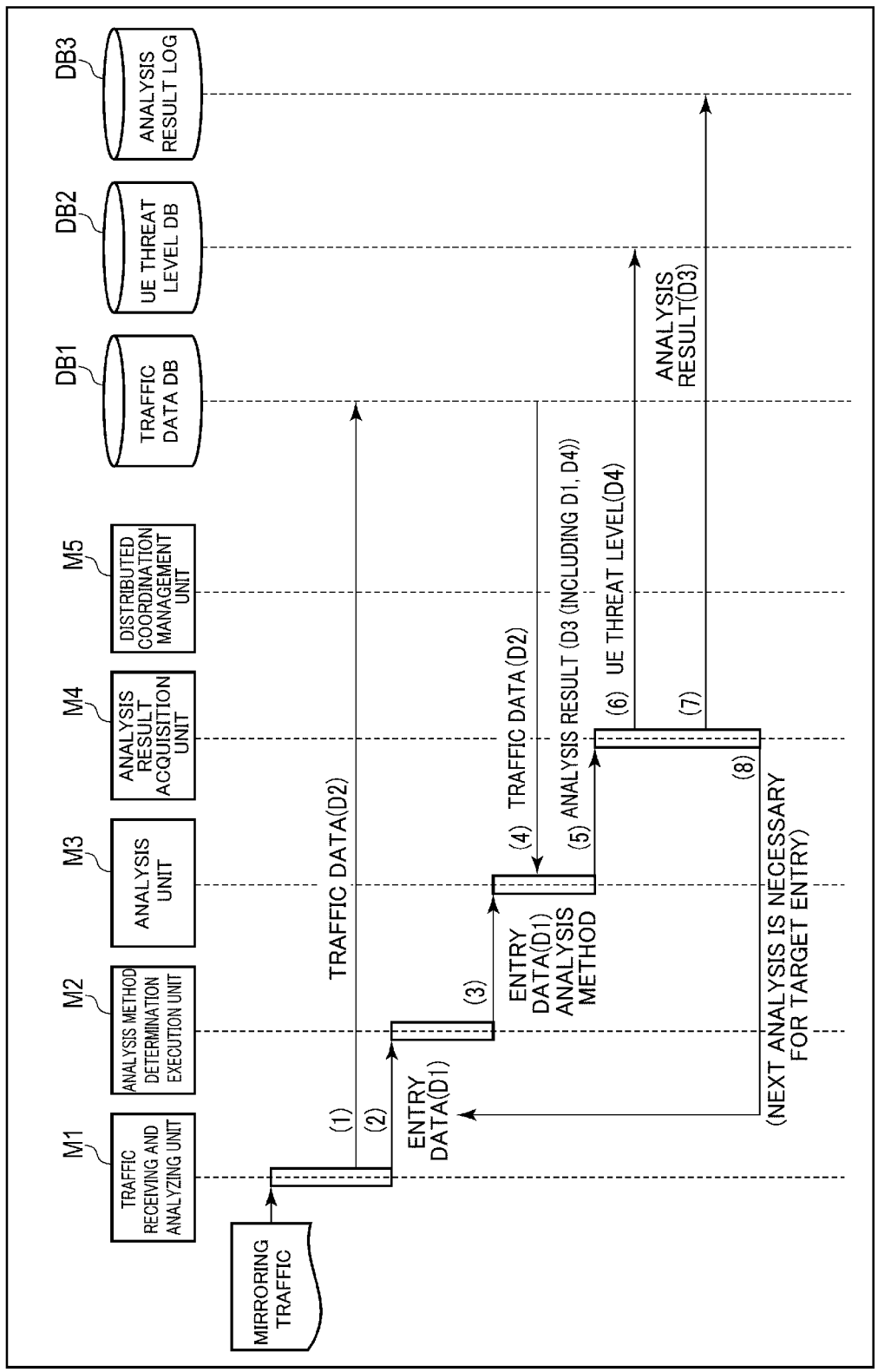
FIG. 9 is a diagram showing a flow of processing performed by the abnormal traffic analysis apparatus.

FIG. 9 is a diagram showing a flow of processing performed by the abnormal traffic analysis apparatus 28 (abnormal traffic detection engine 50).

(1) First, upon receiving traffic, the traffic receiving and analyzing unit M1 creates traffic data D2 and writes the traffic data D2 into the traffic database DB1.

(2) The traffic receiving and analyzing unit M1 performs syntactic analysis on the traffic, selects a packet to be analyzed, acquires common information, such as 5tuple information (source address, destination addresses, source port number, destination port number, and protocol information), included in an IP (Internet Protocol) packet header, payload information, etc., and creates entry data D1. The traffic receiving and analyzing unit M1 gives the entry data D1 to the analysis method determination unit M2.

(3) Based on the received entry data D1, the analysis method determination unit M2 determines an analysis method to be executed next, using an analysis degree determination rule described later, and gives the entry data D1 with the determined degree of analysis added thereto to the analysis unit M3.

(4) The analysis unit M3 acquires traffic data D2 that corresponds to the received entry data D1 from the traffic database DB.

(5) The analysis unit M3 analyzes the entry data D1 using the analysis method designated by the analysis method determination unit M2 and gives an analysis result D3 and the entry data D1 to the analysis result acquisition unit M4. The analysis unit M3 executes analysis for determining a threat level of each target entry while repeatedly resetting the degree of detail (degree) of attack detection, for example. A specific example of the analysis will be described later.

(6) The analysis result acquisition unit M4 acquires a target entry threat level D4 (described later) from the received analysis result D3, determines a UE threat level by applying a rule for determining the threat level of the monitoring target IoT device, and updates the UE threat level database DB2.

(7) Furthermore, the analysis result acquisition unit M4 stores the received analysis result D3 in the analysis result log DB3.

(8) The analysis result acquisition unit M4 acquires the target entry threat level D4 from the analysis result D3 and gives the analysis method determination unit M2 entry data D1 for which next analysis needs to be performed and the target entry threat level D4.

Note that (3) the analysis method determination unit M1 determines an analysis method using the analysis degree determination rule and gives the analysis unit M3 the degree of immediately preceding analysis, the target entry threat level, and the entry data D1 with the analysis method added thereto.

Here, a specific example of analysis performed by the analysis unit M3 will be described.

In the UE threat level database DB2, results of attack detection performed with respect to past communications are stored in association with information (e.g., an IP address or a terminal ID) for identifying the source, for each degree of detail (hereinafter also referred to as "degree") of attack detection, such as a detection result of a first degree of detection (analysis A), a detection result of a second degree of detection (analysis B), and so on. In addition, a threat level that is determined from results of attack detection of respective degrees of detail is stored in the UE threat level database DB2, in association with the above information.

The threat level may be expressed using two values, i.e., expressed as 0 or 1, or three or more numerical values may also be set for respective threat levels. For example, a configuration is also possible in which ten numerals 0, 1, . . . , 9 are set for respective threat levels, a larger numeral indicates stronger maliciousness, and traffic is determined as being apparently malicious if the numeral shown in a threat level column is 9.

Assume that, in the UE threat level database DB2, at least sources (e.g., IP addresses or terminal IDs) of information received in the past and threat levels of the information received in the past are stored in association with each other as entry data in advance.

The analysis unit M3 compares an identified source with each entry stored in the UE threat level database DB2 and determines the degree of detail of attack detection to be performed on the received information. More specifically, the analysis unit M3 checks, with respect to traffic for which the source is identified, whether or not an entry that corresponds to the identified source is included in the UE threat level database DB2. The analysis unit M3 may also determine the degree of detail of attack detection to be performed on the received information by using the following analysis degree determination rule (1) or (2), for example.

(1) Specific Example

If the UE threat level database DB2 does not include a corresponding entry, the degree of detail (degree) is set to the first degree. On the other hand, if the UE threat level database DB2 includes a corresponding entry, the degree of detail (degree) is set to a higher degree that is next to the threat level shown in the entry.

(2) Specific Example

If the UE threat level database DB2 does not include a corresponding entry, the degree of detail (degree) is set to the first degree. On the other hand, if the UE threat level database DB2 includes a corresponding entry, the degree of detail (degree) is set to a degree that is equal to the threat level shown in the entry.

In the abnormal traffic analysis apparatus 28 according to the present embodiment, an attack detection algorithm and the degree of detail (degree) are determined according to the communication path (communication method) used to transmit traffic. Examples of attack detection algorithms that can be used in this example include rule base attack detection, detection of port scanning, detection of a change of the used port, detection of a change in the traffic flow rate, detection of a change of the packet receiving timing, DPI, attack detection for detecting abnormality based on a difference between actually measured data and data that is predicted using data acquired as time series data. As the attack detection algorithm becomes more detailed and poses a higher cost, a higher degree of detail (degree) is set.

Next, the analysis unit M3 executes attack detection with respect to the received traffic based on the determined degree of detail (degree) (analysis parameter).

If the result of attack detection is normal, the analysis unit M3 gives the analysis result D3 to the analysis result acquisition unit M4. The analysis result acquisition unit M4 stores information for identifying the source and the detection result (target entry threat level D4) in the analysis result log DB3 and the UE threat level database DB2. An anomaly identifier, a timestamp, information (an IP address or a terminal ID) for identifying the source, detection results for respective degrees of detail, the numbers of times of detection for respective degrees of detail, a final detection result, a countermeasure completion flag, etc., are stored in the analysis result log DB3.

On the other hand, if the result of attack detection is not normal (there is concern or abnormality), the analysis unit M3 determines whether or not it is necessary to perform attack detection of a higher degree with respect to the received traffic. If it is determined that attack detection of a higher degree is unnecessary, the analysis result acquisition unit M4 stores, as the result of analysis performed by the analysis unit M3, information for identifying the source and the detection result in the analysis result log DB3 and the UE threat level database DB2.

Cases in which the result of attack detection is not normal include the following specific cases (1) and (2), for example. (1) The communication is apparently abnormal (unauthorized) and therefore there is not much need to execute attack detection of a higher degree. If the numeral shown in the above-described threat level column is 9, for example, the communication is apparently malicious and therefore attack detection of a higher degree can be omitted to effectively use calculation resources. (2) Attack detection of the highest degree has been already executed, and attack detection of a higher degree cannot be executed.

On the other hand, if it is determined that attack detection of a higher degree needs to be performed, the analysis unit M3 redetermines the degree of detail of attack detection to be performed on the received information, based on the result of attack detection. The analysis unit M3 executes attack detection again based on the redetermined degree of detail (degree). If the result of attack detection is determined as not being normal, the analysis unit M3 determines whether or not it is necessary to further perform attack detection of a higher degree. This process is repeatedly executed so long as the result of attack detection is determined as not being normal. The following specific methods (1) to (4) can be used as methods for redetermining the degree of detail (degree) by the analysis unit M3.

(1) Specific Example

The degree of detail (degree) of target attack detection is always increased by one.

(2) Specific Example

Cases in which output of the attack detection algorithm is expressed using three levels, i.e., normal/there is concern/ there is abnormality.

Output=there is concern→determination result=Yes (the degree is increased by one)

Output=there is abnormality→determination result=Yes (the degree is increased by two)

(3) Specific Example

Cases in which output of the attack detection algorithm is expressed using three levels, i.e., normal/there is concern/ there is abnormality.

Output=there is concern→determination result=No (the degree is not increased→S15aN→End)

Output=there is abnormality→determination result=Yes (the degree is increased by one)

(4) Specific Example

Cases in which output of the attack detection algorithm represents the presence or absence of abnormality using a numerical value. For example, a case in which output of the attack detection algorithm is 0.0 to 1.0, the degree of abnormality increases as the value approaches 1.0, and a threshold value used for determining the presence or absence of abnormality is 0.5.

Output=0.5 or more and less than 0.6→determination result=Yes (the degree is increased by one)

Output=0.6 or more and less than 0.7→determination result=Yes (the degree is increased by two)

Output=0.7 or more and less than 0.8→determination result=Yes (the degree is increased by three)

Output=0.8 or more and less than 0.9→determination result=Yes (the degree is increased by four)

Output=0.9 or more→determination result=Yes (the degree is increased by five)

According to the abnormal traffic analysis apparatus 28 of this example, attack detection is ended early as for an IoT device (device) that has a low risk, and therefore calculation resources can be kept from being unnecessarily used.

Similarly, attack detection is ended early as for an IoT device that is apparently unauthorized as well, and therefore calculation resources can be kept from being unnecessarily used.

Furthermore, if the risk of an IoT device is in a gray area, processing is repeatedly executed to ensure reliability of attack detection.

Furthermore, as for an IoT device that is registered as an entry in the UE threat level database DB2, a degree of detail according to the registered threat level is initially set, and accordingly attack detection of a lower degree of detail is appropriately skipped, and calculation resources can be kept from being unnecessarily used.

As described above, according to the abnormal traffic analysis apparatus 28 of this example, calculation resources can be effectively used.

The following describes operations that are performed when a handover information notification message regarding an IoT device (UE) is received from the moving object network management system.

Figure 10:
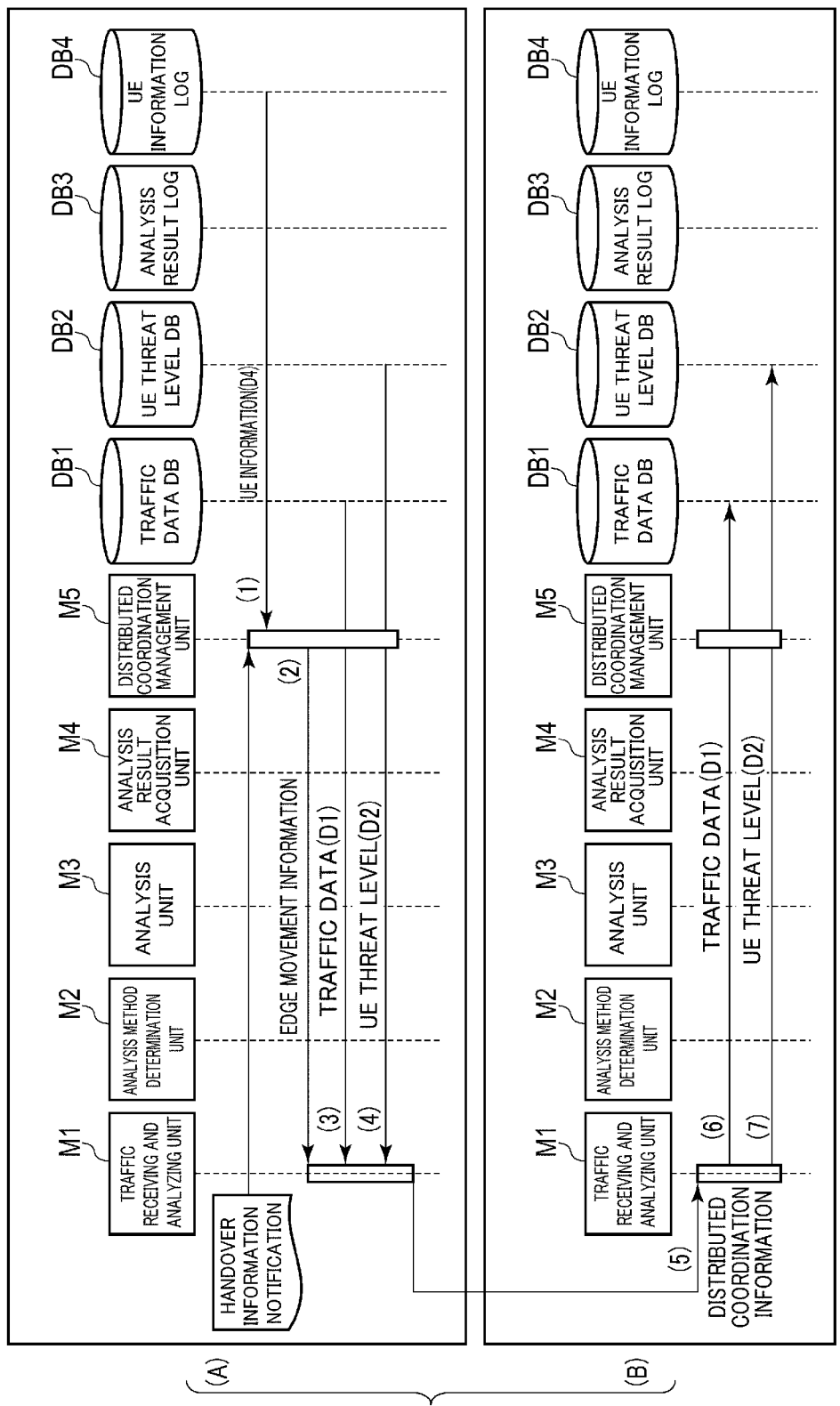
FIG. 10 is a diagram showing a flow of processing performed by a prior-to-movement abnormal traffic analysis apparatus and a post-movement abnormal traffic analysis apparatus.

FIG. 10 (A) is a diagram showing a flow of processing that is performed by a prior-to-movement abnormal traffic analysis apparatus 28 (abnormal traffic detection engine 50)

when a handover information notification message is received, and FIG. 10 (B) is a diagram showing a flow of processing that is performed by a post-movement abnormal traffic analysis apparatus 28 (abnormal traffic detection engine 50).

Figure 11:
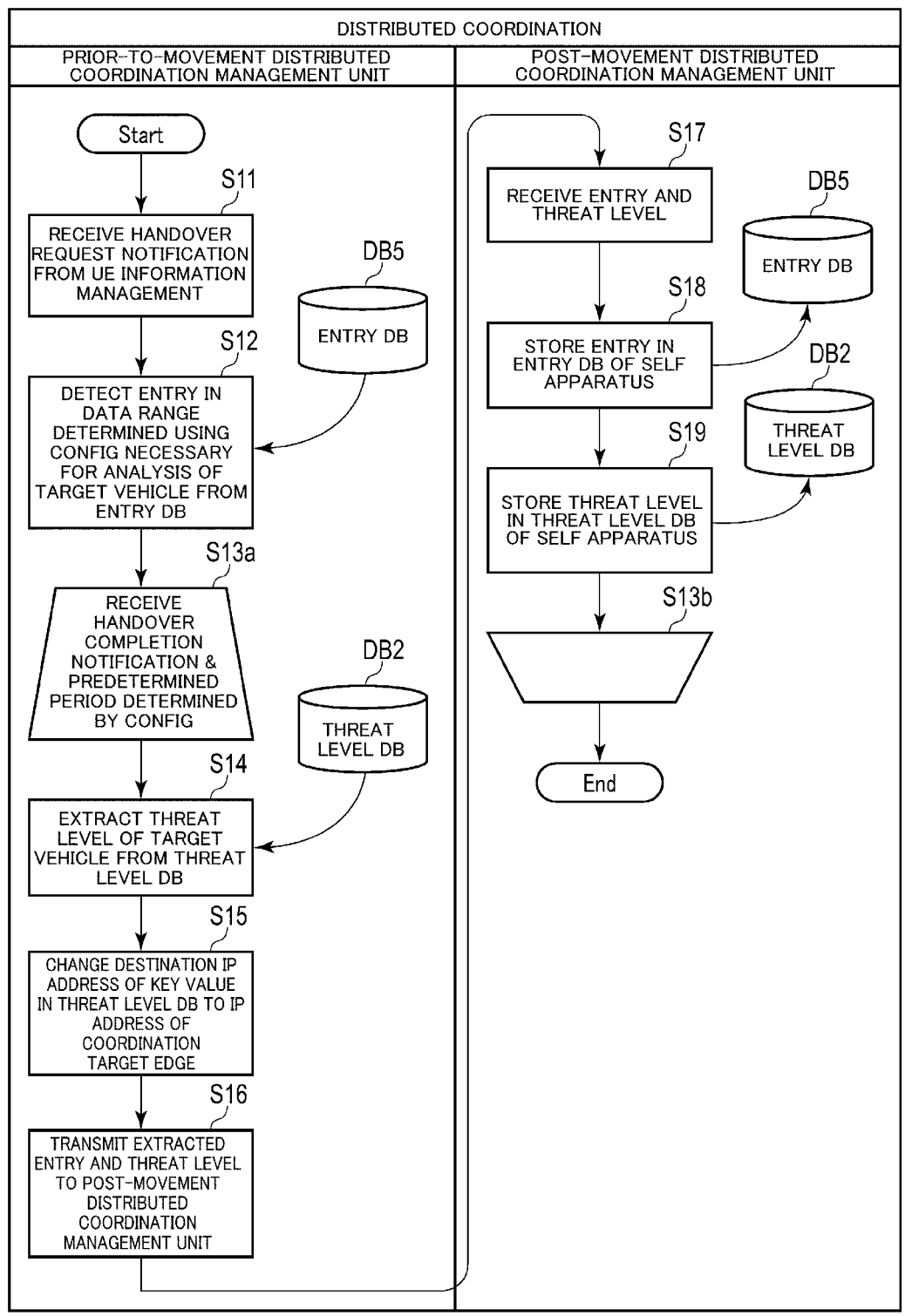
FIG. 11 is a flowchart showing distributed coordination processing performed by the prior-to-movement abnormal traffic analysis apparatus and the post-movement abnormal traffic analysis apparatus.
Figure 12:
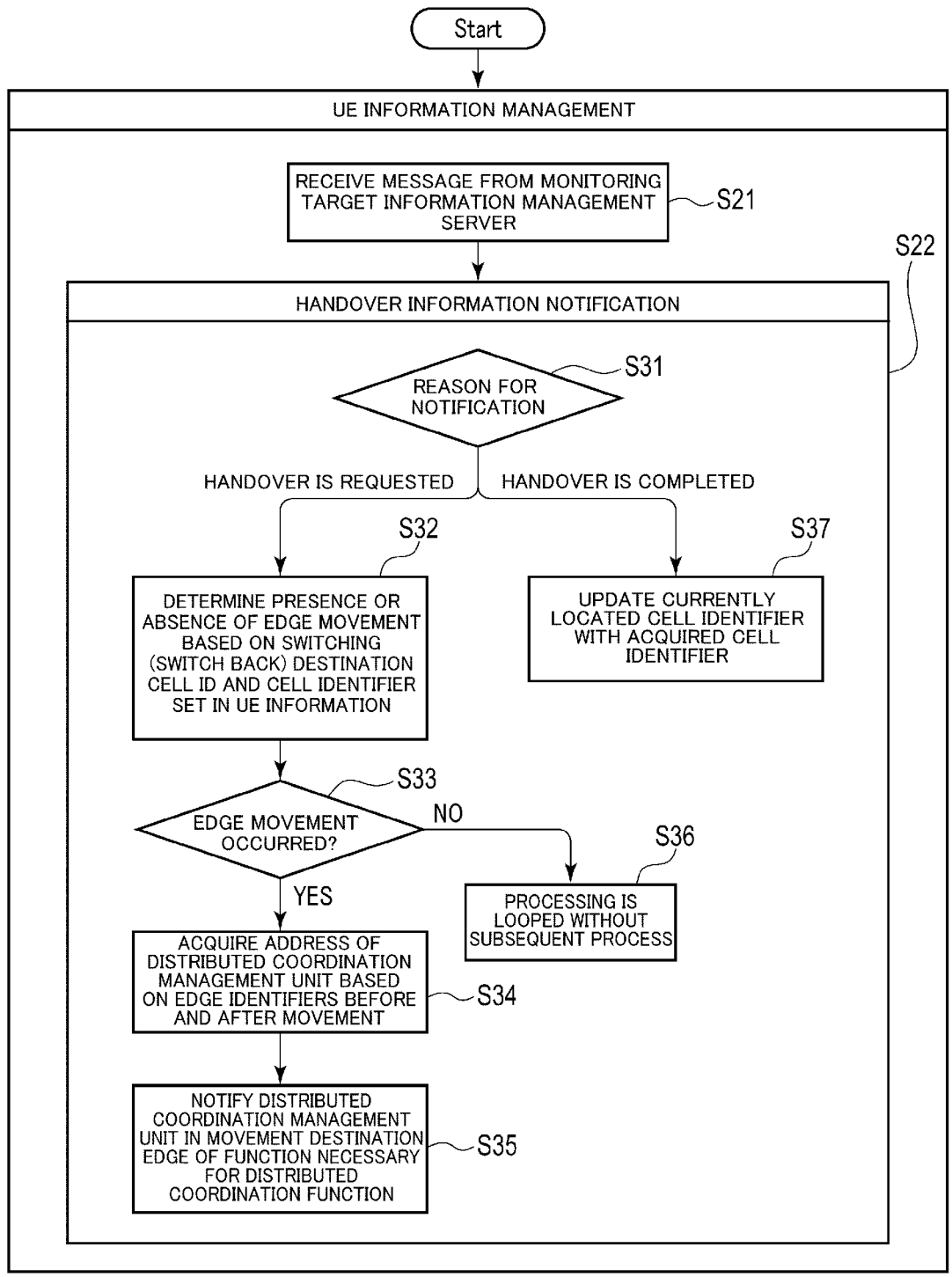
FIG. 12 is a flowchart showing operations of a distributed coordination management unit.

FIG. 11 is a flowchart showing distributed coordination processing performed by the prior-to-movement abnormal traffic analysis apparatus 28 (distributed coordination management unit M5) and the post-movement abnormal traffic analysis apparatus 28 (distributed coordination management unit M5), and FIG. 12 is a flowchart showing operations of the distributed coordination management unit M5.

(1) Upon receiving a handover information notification message (handover trigger) from the monitoring target information management server 15 (FIG. 12, Step S21), the distributed coordination management unit M5 of the prior-to-movement abnormal traffic analysis apparatus 28 executes handover information notification processing (Step S22). Note that, although the distributed coordination management unit M5 receives a message about a handover trigger from the management server 17 of the mobile network 33 via the monitoring target information management server 15, a handover trigger may also be acquired using another method. For example, a handover trigger (inter-edge movement) may also be estimated based on conditions of movement of vehicles in which individual IoT devices 40 are installed.

First, the distributed coordination management unit M5 determines the reason for notification of the message (Step S31). If the reason for notification of the message is a request for handover, the distributed coordination management unit M5 acquires, from the message, information (a cell ID) regarding a movement destination cell and information indicating a cell in which an IoT device (UE) that is managed using UE information stored in the UE information database DB4 is located.

(2) Further, the distributed coordination management unit M5 checks edge/service/cell correspondence information that is managed using the UE information, and determines whether or not movement between edges occurs with respect to a cell before the movement and a cell after the movement (Step S32).

(3) If movement between edges does not occur (Step S33, No), the distributed coordination management unit M5 does not perform subsequent processes and the processing is looped (Step S36). On the other hand, if movement between edges occurs (Step S33, Yes), the distributed coordination management unit M5 acquires the address of an abnormal traffic analysis engine based on edge identifiers before and after the movement (Step S34). Furthermore, the distributed coordination management unit M5 notifies the traffic receiving and analyzing unit M1 of the movement between edges together with information regarding the IoT device (EU) and the movement destination edge.

(4) The traffic receiving and analyzing unit M1 extracts entry data regarding the IoT device (EU), UE threat level information, and traffic data based on specific conditions that are set in advance, and gives the extracted data and information as distributed coordination information to the traffic receiving and analyzing unit M1 of the abnormal traffic analysis device 28 (abnormal traffic analysis engine) that is located in the movement destination edge, based on the acquired address (Step S16, S35).

Namely, analysis continuation information that is necessary to continuously analyze abnormal traffic with respect to traffic transmitted from the IoT device that has moved between edges is given to the abnormal traffic analysis apparatus 28 of the movement destination edge. In the present embodiment, the analysis continuation information is given via the distributed coordination management unit M5. Here, a threat level and traffic data that are being analyzed are also given to the abnormal traffic analysis apparatus 28 of the movement destination edge. Therefore, even if an IoT device moves between edges, analysis can be seamlessly performed with respect to the IoT device.

FIG. 11 shows creation of the distributed coordination information (Steps S12 to S16) in a case in which a handover request message is received (Step S11).

The traffic receiving and analyzing unit M1 extracts entry data that is necessary to perform analysis regarding the IoT device, from the entry database DB5 (Step S12). Here, entry data to be extracted is limited to entry data in a data range that is determined according to conditions set in advance. For example, the traffic receiving and analyzing unit M1 calculates the range of entry data that is necessary for analysis based on an inclusion relationship between data to be analyzed, and extracts entry data from the calculated range. For example, if a time series analysis is to be performed using entry data of past 30 seconds and another time series analysis is to be performed using entry data of past 10 minutes that includes the above-described entry data of past 30 seconds, the range of entry data to be analyzed is set to the entry data of past 10 minutes, based on the inclusion relationship. Alternatively, entry data that is necessary for analysis can also be extracted from a range that is determined based on not only an inclusion relationship regarding time but also another inclusion relationship such as a positional relationship.

Also, the traffic receiving and analyzing unit M1 extracts the threat level of the target IoT device from the UE threat level database DB2 (Step S14). Furthermore, information, e.g., an IP address, for identifying the IoT device registered in the UE threat level database DB2 is changed to an IP address of an edge that is the communication source. If a flag that indicates that the data has been given is added at this time, which edge has been attacked can be checked when analysis is performed (Step S15).

Note that a configuration is also possible in which the traffic receiving and analyzing unit M1 determines whether or not to transmit the distributed coordination information to the abnormal traffic analysis apparatus 28 of the movement destination edge, based on the current threat level (calculated from results of past analysis) of the IoT device. In a situation in which diagnosis has been established, such as a case in which the threat level is higher than a level that is set in advance, it is not necessary to continuously perform analysis in the movement destination edge. In such a case, it is possible to determine that the distributed coordination information need not be transmitted.

By limiting the range of entry data necessary for analysis or determining not to transmit the distributed coordination information based on the threat level as described above, it is possible to suppress an increase in the amount of traffic between abnormal traffic analysis apparatuses 28 of different edges. As a result, networks can be efficiently used.

(5) The traffic receiving and analyzing unit M1 of the abnormal traffic analysis apparatus 28 located in the movement destination edge receives entry data, traffic data, and UE threat information from the distributed coordination information (Step S17) and stores the entry data, the traffic data, and the UE threat information in the entry database DB5, the traffic data database DB1, and the UE threat level database DB2 (Steps S18 and S19), respectively.

Note that the distributed coordination information is continuously transmitted between the abnormal traffic analysis apparatuses 28 until a handover completion notification is received or for a period that is set in advance (Steps S13a to S13b). Thus, it is possible to avoid deficiency of data that is necessary for continuous analysis, which would otherwise be caused along with movement of the IoT device between edges.

If the handover completion notification is received (Step S31), the distributed coordination management unit M5 of the edge from which the IoT device has moved updates the currently located cell identifier of the UE information stored in the UE information database DB4 with a cell identifier that is acquired from the message (Step S37).

As described above, in the communication system according to the present embodiment, inter-engine information sharing functions of the abnormal traffic analysis apparatuses 28 provided in respective edges cooperate with each other, and the distributed coordination information including data that is necessary to perform analysis regarding the target IoT device in the movement destination edge as well is transmitted from the abnormal traffic analysis apparatus 28 of the movement destination edge, and therefore it is possible to appropriately share information and seamlessly perform analysis even if the IoT device moves between edges.

Note that each method described in the embodiment can be stored, as a program (software means) that can be executed by a computer, in a recording medium, such as a magnetic disk (flexible disk, hard disk, etc.), an optical disk (CD-ROM, DVD, MO, etc.), or a semiconductor memory (ROM, RAM, flash memory, etc.), for example, or transmitted and distributed using a communication medium. Note that a program that is stored on the medium side includes a setting program for configuring, in the computer, software means (including not only an execution program but also a table or a data structure) to be executed by the computer. A computer that realizes the present apparatus executes the above-described processing by reading a program recorded in a recording medium, and in some cases, constructing software means following a setting program, and as a result of operations being controlled by the software means. Note that a recording medium mentioned in the present specification is not limited to a recording medium that is to be distributed, but also includes a storage medium, such as a magnetic disk, a semiconductor memory, etc., that is provided in a computer or a device connected to the computer via a network.

Note that the present invention is not limited to the above-described embodiment, and various alterations can be made within a scope not departing from the gist of the present invention when the present invention is implemented. Furthermore, in implementation of embodiments, the embodiments can be appropriately combined as far as possible, and in such a case, combined effects can be achieved. Furthermore, the above-described embodiment includes inventions in various stages, and various inventions can be extracted by appropriately combining a plurality of disclosed constitutional elements.

REFERENCE SIGNS LIST 10 (10-1, . . . , 10-m) Core network
12 Cloud server
14 Dynamic map server
15 Monitoring target information management server
16 Internet
20 (20-1, . . . , 20-n) Local network
22 (22-1, . . . , 22-n) Edge server
24 (24-1, . . . , 24-n) Dynamic map server
26 (26-1, . . . , 26-n) Probe collecting server
27 (27-1, . . . , 27-n) Gateway
28 (28-1, . . . , 28-n) Abnormal traffic analysis apparatus
28A Processor
28B Memory
28C Communication interface
28D Storage device
32 Base station
M1 Traffic receiving and analyzing unit
M2 Analysis method determination unit
M3 Analysis unit
M4 Analysis result acquisition unit
M5 Distributed coordination management unit
DB1 Traffic data database
DB2 UE threat level database
DB3 Analysis result log
DB4 UE information database

The invention claimed is:

1. An abnormal traffic analysis apparatus comprising:
a processor; and
a non-transitory storage medium having computer program instructions stored thereon, when executed by the processor, perform to:
receive traffic from a device;
analyze whether or not traffic received from the device is abnormal traffic;
record a result of analysis performed; and
manage movement of the device between edges, wherein, in response to a determination that a device that is a target of analysis moves to an edge, creates information that identifies the device and identifies the edge and transmits the information to an apparatus that is included in the edge to which the device moves;
wherein the apparatus continues analysis of traffic received from the device.

2. The abnormal traffic analysis apparatus according to claim 1, wherein the computer program instructions further perform to create the information, based on any of traffic data according to the traffic received from the device, entry data in which a source of information received in the past and a threat level of the Information received in the past are associated with each other, and data that indicates a threat level corresponding to the device.

3. The abnormal traffic analysis apparatus according to claim 2, wherein the computer program instructions further perform to determine a threat level by repeatedly resetting a degree of detail of abnormality, and determines whether or not to transmit the information, based on a threat level corresponding to the device.

4. The abnormal traffic analysis apparatus according to claim 2, wherein the computer program instructions further perform to extracts limited data from a data range that is determined according to conditions set in advance, and creates the information, based on the limited data.

5. The abnormal traffic analysis apparatus according to claim 1, wherein the computer program instructions further perform to receive monitoring target information that is managed by an external server and in which a correspondence relationship regarding location area conditions of a monitoring target device is recorded, and manages movement of the device between edges based on the monitoring target information.

6. A method for analyzing abnormal traffic comprising: a receiving step of receiving traffic from a device; an analysis step of analyzing whether or not traffic received from the device is abnormal traffic; an analysis result recording step of recording a result of analysis performed in the analysis step; a device managing step of managing movement of the device between edges; and in response to a determination that a device that is a target of analysis performed in the analysis step moves to an edge, creating Information that identifies the device and identifies the edge and transmitting the information to an apparatus that is included in the edge to which the device moves, wherein the apparatus continues analysis of traffic received from the device.

\* \* \* \* \*